Aug. 29, 1933.　　E. SHALOUM ET AL　　1,924,463
ICE CREAM CONE MACHINE
Filed Oct. 24, 1931　　5 Sheets-Sheet 1
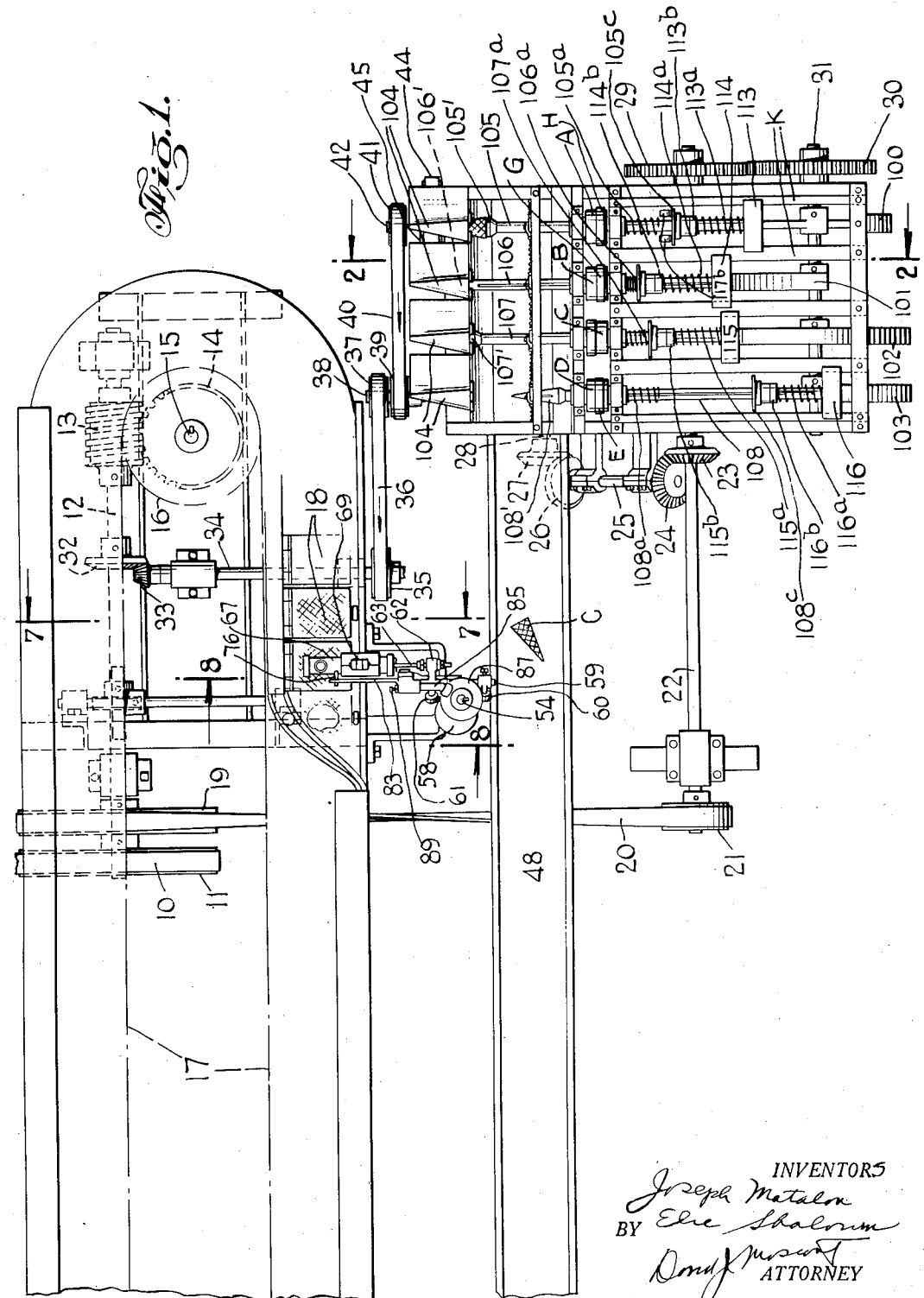

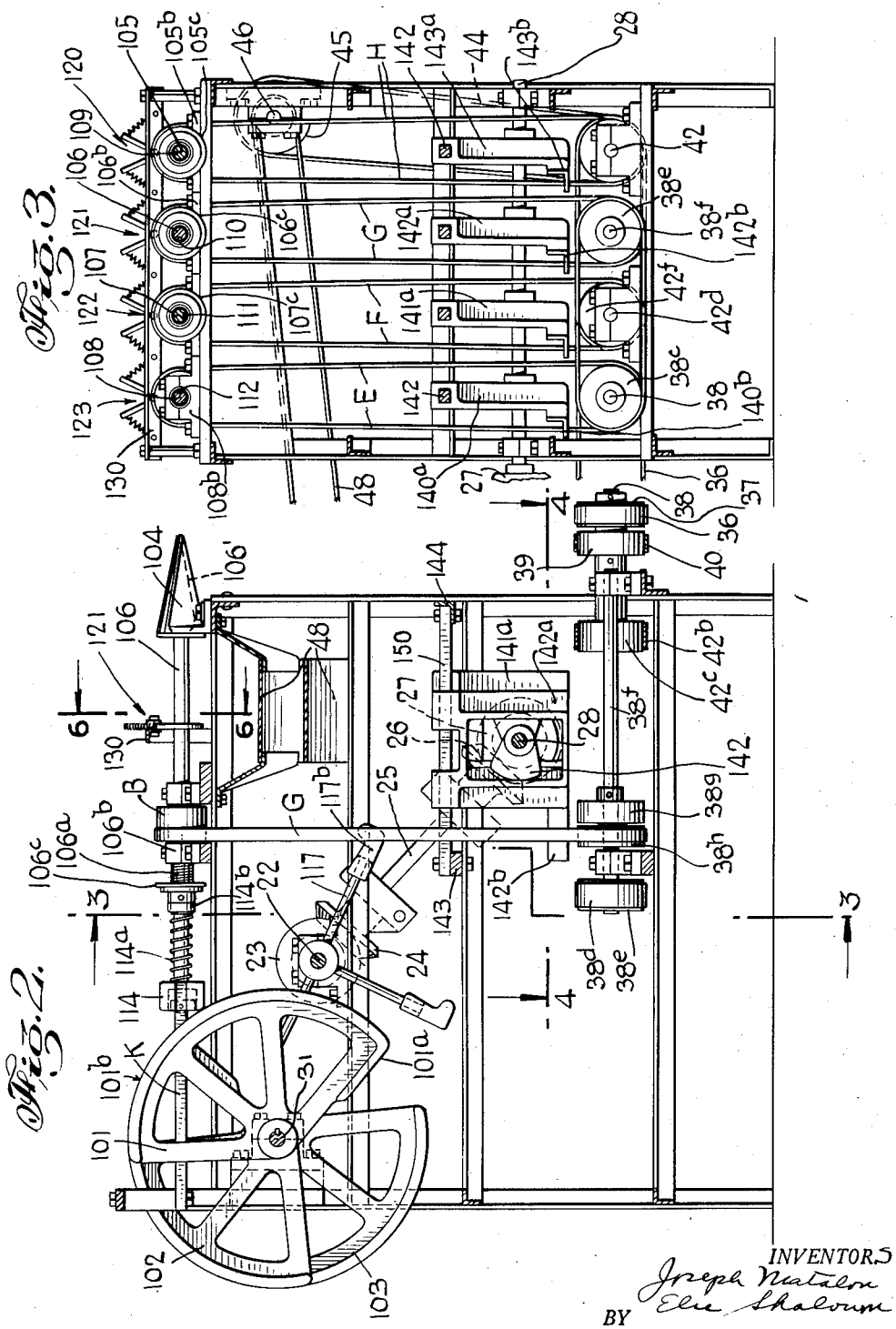

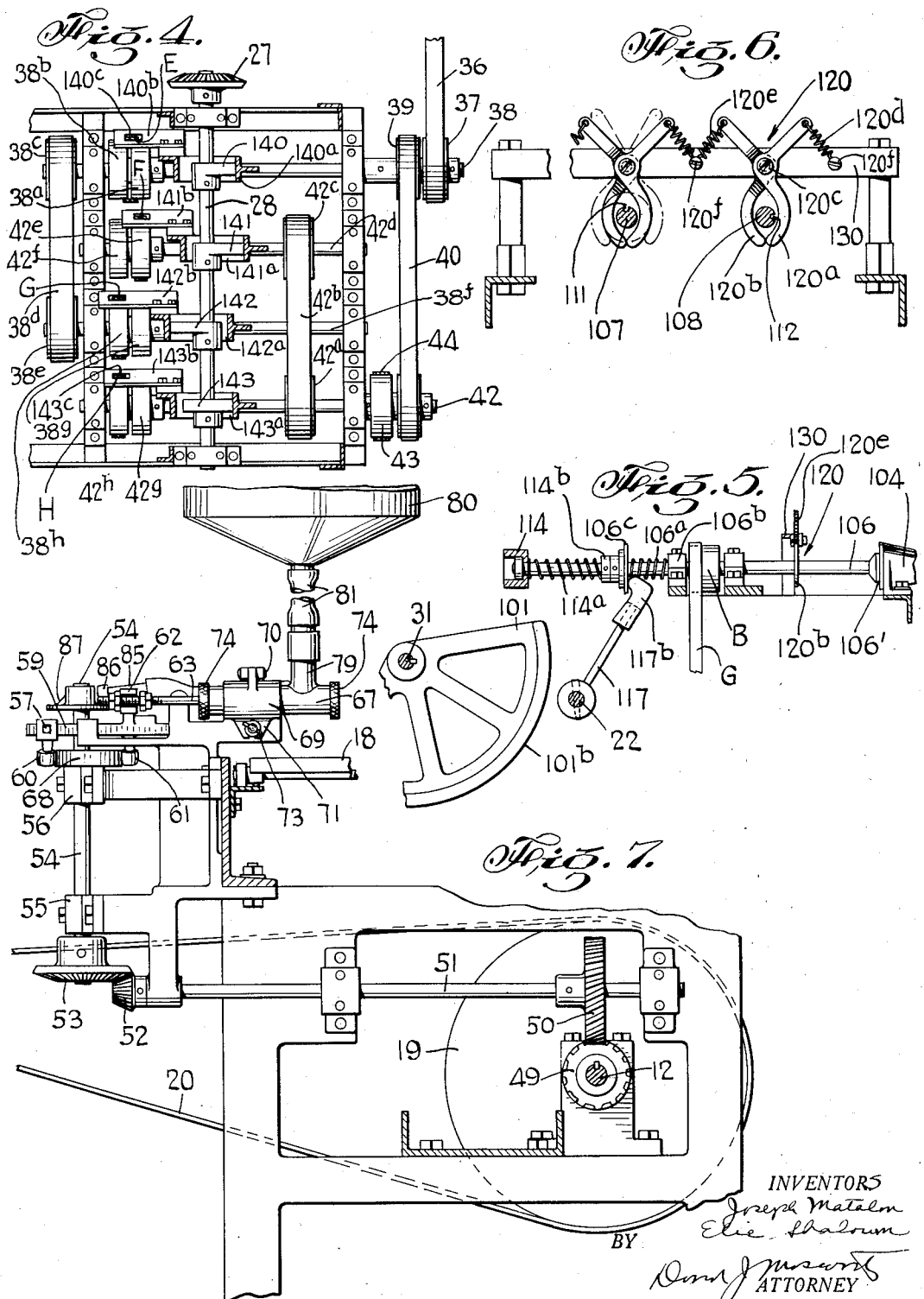

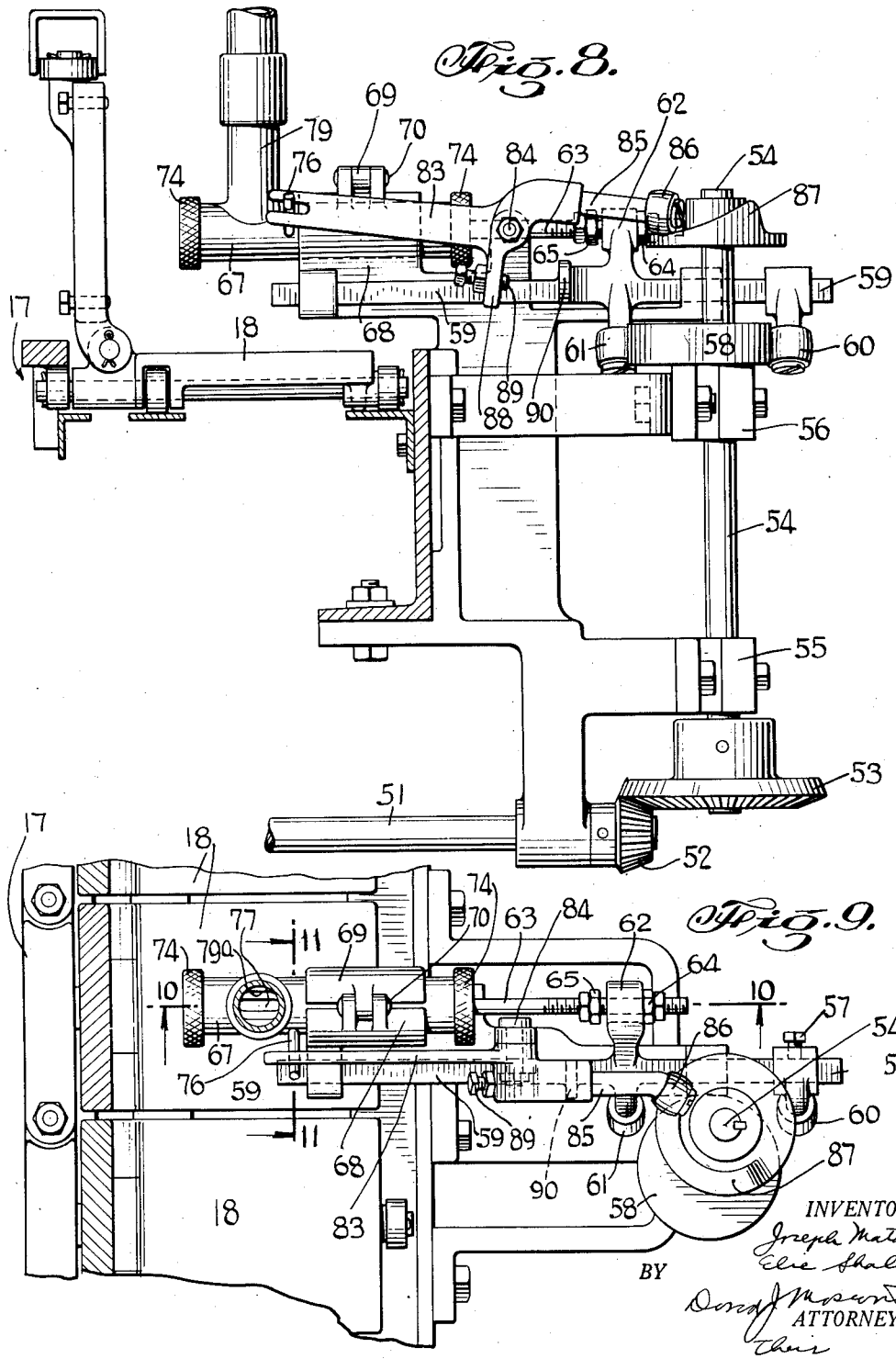

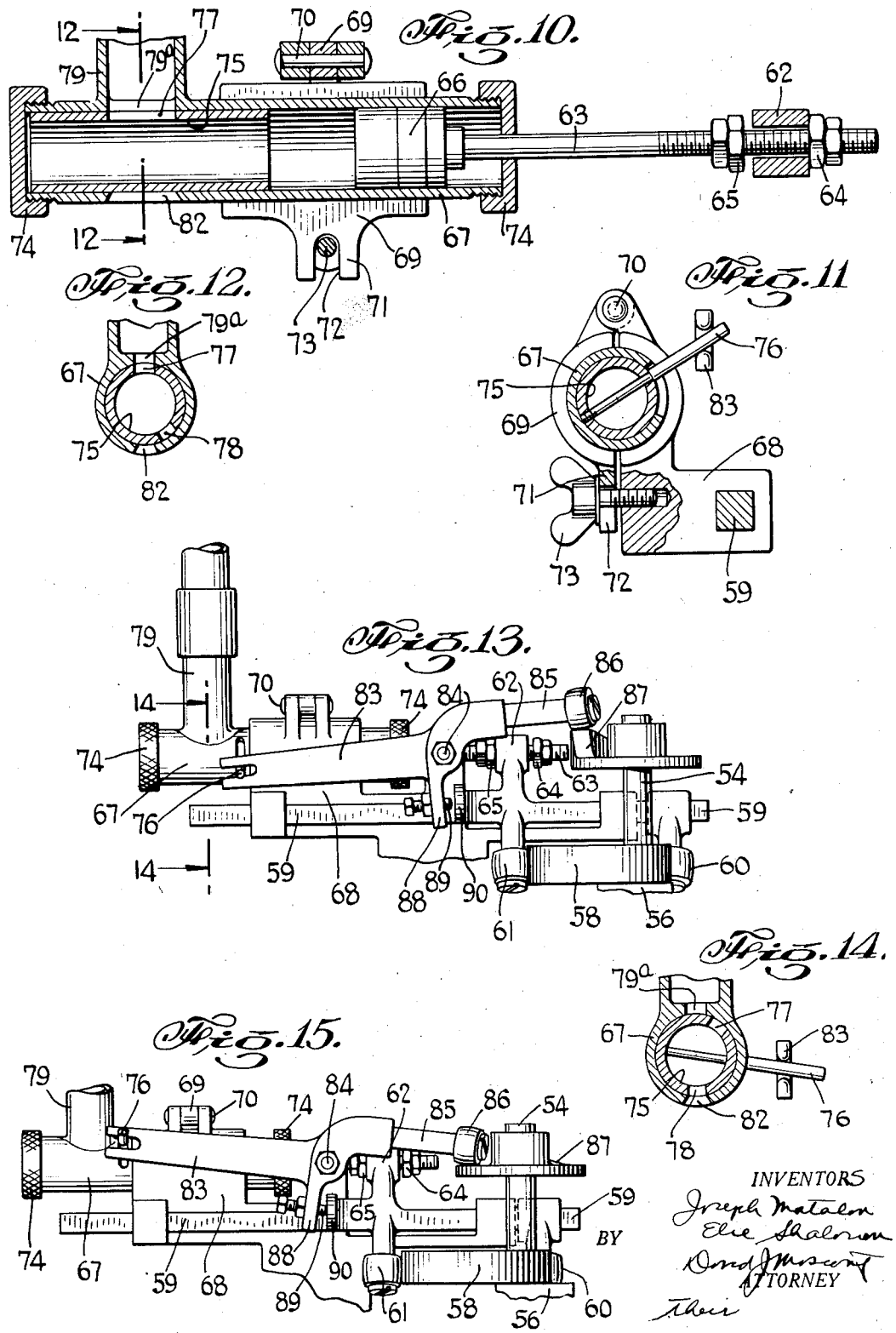

Patented Aug. 29, 1933

1,924,463

UNITED STATES PATENT OFFICE 1,924,463

ICE CREAM CONE MACHINE

Elie Shaloum and Joseph Matalon, New York, N. Y., assignors to S. & S. Cone Corporation, New York, N. Y., a corporation of New York Application October 24, 1931. Serial No. 570,896

8 Claims. (Cl. 107—58)

This invention relates to improvements in ice cream cone machines, being particularly directed to improved formation of batter feeding and cone shaping apparatus applied in association with the baking members of the machine.

Among the objects of this invention, it is aimed to provide a novel form of batter feed mechanism operable to deposit a controlled amount of batter upon the open surface of a book mold as the same passes directly thereunder.

A further object of this invention is to provide a novel form of control for the cone forming mechanism, whereby the elements operable to form and seal the cones are caused to be displaced in sequential progression through the medium of a novel form of operating mechanism.

In general, the apparatus involved, insofar as it relates to the batter baking mechanism, is of the nature shown and disclosed in the Tatosian Patent No. 1,540,041, June 2nd, 1925, which essentially shows the general combination of baking batter feed and cone shaping elements in a machine of the type described, it being, however, the object of this invention, as aforestated, to provide novel form of operating controls for the batterfeed and cone shaping apparatus applied in the production of ice cream cones.

These and other advantages, capabilities, and features of the invention will appear from the subjoined detail description of one specific embodiment therefor illustrated in the accompanying drawings, in which Figure 1 is a plan view of the apparatus as assembled.

Figure 2 is a side elevation, partly in section, along lines 2—2 of Figure 1.

Figure 3 is a side view, partly in section, along lines 3—3 of Figure 2.

Figure 4 is a plan view, partly in section, along lines 4—4 of Figure 2.

Figure 5 is a detailed assembly, partly in section, of a mandrel and spindle assembly.

Figure 6 is a front view showing the stripper elements.

Figure 7 is a side elevation along lines 7—7 of Figure 1, partly in section, and showing the drive for the batter pump operating mechanism.

Figure 8 is a side elevation, partly in section, taken along lines 8—8 of Figure 1, and showing a detail of the batter pump mechanism.

Figure 9 is a plan view, partly in section, of the structure shown in Figure 8.

Figure 10 is a side elevation, partly in section, along lines 10—10 of Figure 9.

Figure 11 is a cross-view, partly in section, of the pump taken along lines 11—11 of Figure 9.

Figure 12 is a cross-section, taken along lines 12—12 of Figure 10.

Figure 13 is a detailed assembly view of the batter pump mechanism in open position.

Figure 14 is a section taken along lines 14—14 of Figure 13, showing the valve in open position.

Figure 15 is a detailed assembly view of the batter pump mechanism in its closed position.

In the drawings, the structure involved in this device may be separated into three distinct parts, all of which, when combined, produce the completed cone from the raw material, the respective parts being the batter feed apparatus, the baking apparatus and the cone forming apparatus.

Referring particularly to the showing in Figure 1, wherein the complete device is disclosed in assembly, the drive belt 10 is operated from the motor, not shown, the said drive belt being adapted to drive pulley 11 which is carried on the shaft 12 mounted on suitable bearings fastened to the frame of the machine, as shown. On the shaft 12 there is mounted worm driving gear 13, which coacts with driven worm gear 14 which is keyed to shaft 15 extending perpendicularly upwardly with respect to shaft 12. On the shaft 15, above driven worm gear 14, there is carried as by being keyed the baking mold drive sprocket 16, which sprocket is adapted to actuate chain 17 shown in dot and dash lines, to which chain there is adapted to be attached the baking irons 18 of the conventional book mold type, the particular shape, formation and relationship of the baking plates with respect to the drive and the heating units, not shown in the drawings, being of a nature similar to the disclosure of the patent to Tatosian, No. 1,540,041, above specified, with the exception that the Tatosian irons are carried in an ellipse formed in the vertical plane, whereas in this disclosure irons are carried in a horizontally disposed ellipse.

In view of the fact that the various elements involved in the operation of the batter pump and forming device are driven from the same primary source, brief description will be made from the operating connections leading therefrom to the respective elements before the constructional detail of the respective apparatus will be disclosed.

*The drive for the elements of the cone forming apparatus*

On the shaft 12 there is mounted driving pulley 19 which actuates belt 20 leading to driven pulley 21 mounted on shaft 22. On the shaft 22 intermediate its end, there is keyed bevel gear 23, which meshes with driven bevel gear 24, which last-named gear is pinned to shaft 25 which is angularly downwardly inclined with respect to the horizontal plane of shaft 22, which shaft is mounted in suitable bearings, as disclosed. To the lower end of shaft 25 there is keyed or pinned bevel gear 26 which meshes with driven bevel gear 27 mounted for rotation on shaft 28, which is disposed horizontally with respect to shaft 25 and parallel with respect to shaft 22.

On shaft 28 there is mounted a series of cams which serve to operate the belt-shifting mechanism for controlling the rotation of the cone shaping mandrels, which structure will be described later. On the shaft 22 to the right of driven bevel gear 23 and shown in detail in Figure 2, there is disposed a series of arms which have forked end members serving to withdraw the mandrels from position, the details of the structure of which will be later described.

As shown at the extreme right of Figure 1, there is mounted on shaft 22 a spur gear 29 which meshes with a similar spur gear 30, which is keyed to shaft 31 mounted on suitable bearings and disposed parallelly with respect to shaft 22, the said shaft 31 having mounted thereon a series of segments, the structure and relationship of which will be disclosed as the description progresses.

On the main drive shaft 12 there is mounted large bevel gear 32 which meshes with relatively smaller driven bevel gear 33 carried at the end of shaft 34 disposed in the same plane, but perpendicularly with respect to shaft 12, which shaft 34, as disclosed, is mounted in suitable bearings. At the extreme end of shaft 34 there is mounted a pulley 35 which carries a belt 36, which belt is adapted to drive pulley 37, which is fixed to shaft 38 mounted as a jack shaft at one end of the supporting frame for the forming apparatus. On shaft 38, adjacent pulley 37, there is mounted a second pulley 39 which drives belt 40, the said belt being adapted to actuate driven pulley 41 mounted on shaft 42 parallel to forming apparatus, and is suitably mounted in bearings, as disclosed. On shaft 42 there is mounted driving pulley 43, which actuates belt 44 which in turn drives pulley 45 mounted on shaft 46, on which last named shaft there is mounted a small pulley which drives the inclined conveyor belt 48, as shown in Figures 1 and 3. This mechanism controls the rotation of the mandrels, the structural details and relation of which will be later described.

*The drive for the batter feed apparatus*

To the main drive shaft 12 there is keyed spiral gear 49 which meshes with a larger driven spiral gear 50, which last-named gear is mounted for rotation on shaft 51 disposed in the same plane, but perpendicular with respect to shaft 12. At the extreme end of shaft 51 there is mounted a small bevel gear 52 which meshes with a larger bevel gear 53, which last-named gear is pinned to vertically extending shaft 54, which shaft is mounted in bearings 55 and 56 fixed to the frame. The pump mechanism actuated by the above mentioned driving means will be later described with respect to its structural formation and operation.

*The batter pump operating mechanism*

Referring to Figures 7 to 15 in the drawings, and to the previous description of the driving mechanism for the pump, there is keyed to shaft 54 an eccentric 58 which operates a slide 59, upon which slide there is mounted a pair of rollers 60 and 61. Roller 61 is fixed with respect to the slide 59, whereas roller 60 is adjustably mounted as by means of set screw 57 along the length of slide 59. Integral with slide 59 is a forked arm 62 which operates the piston rod 63 to cause reciprocation thereof. The piston arm 63 is threaded at one end and has mounted thereon on either side of the fork 62 nuts 64 and 65, which are adjustable to limit the throw of the fork 62 which controls the movement of the piston rod 63 and the piston 66 carried at the end thereof. The piston 66 is mounted for reciprocation in cylinder 67, which cylinder is demountably carried within split frame 68, which carrier section has a split cap 69, one portion of which cap 69 is pivotally mounted with respect to the other as by means of pin 70. The split cap 69 has formed thereon a lug 71 which lug is slotted as at 72 for receiving a wing bolt 73 so as to clamp the cylinder 67 within said frame. The cylinder 67 has removable end caps 74 so that the interior of the same may be disposed for cleaning or repair purposes. Within cylinder 67 there is housed a tube member 75 serving as a valve, which is rotatably mounted by means of a pin 76, the said valve having an intake port 77 and discharge port 78. At the upper portion of one end of the cylinder 67 there is disposed an upstanding feed tube 79 through which passes the batter disposed in container 80 positioned above the piston, there being adapted to be disposed between the container 80 and the feed stem 79 a rubber connecting hose 81. On the underface of the cylinder 67 there is disposed a port 82, through which there is adapted to be discharged sufficient quantities of batter as the valve 75 is rotated, and ports 78 and 82 register. When ports 78 and 82 are closed with respect to each other, port 77 and port 79a leading from stem 79 register, so as to permit batter from the container to flow into the piston cylinder.

To operate the pin 76, which opens and closes the respective ports, there is provided an arm 83 pivoted as at 84, which arm 83 has a projection 85, on which projection there is mounted a roller 86, the operation of which roller is controlled by cam 87. This cam 87 is keyed to shaft 54 and is driven thereby, which said cam is mounted on and driven by shaft 54, such cam, however, serving only to open the valve. Integral with the arm 82 is a lug 88 which has mounted thereon a set screw 89, which set screw is adapted, through the medium of the actuation of arm 83 to set pin 76 and the tube 75 controlled thereby, to its closed position.

As the eccentric 58 is rotated into the forward position, it engages and positions the roller 61 to the left (see Figure 13), causing the slide 59 to move to the left and, since the fork 62 of the slide is engaged with the piston rod 63, the piston carried by said rod is positioned forward to force the batter out through discharge port 78 of the tube 75 and discharge port 82 in the cylinder, on to the open face of the book mold positioned therebelow. A further continued motion to the left of the slide 59 causes the lug 90 which forms a part of the slide 59 to engage the set screw 89 with the result that the arm 83 is raised and tube 75, as shown in Figure 15, is rotated to a position whereby ports 78 and 82 are out of alignment, and ports 77 and 79a are in alignment, thus providing for entry of batter from the container into the cylinder.

As the shaft 54 is further rotated the eccentric 58 returns the slide 59 to its normal position through the action of the eccentric 58 in causing roller 60 to be urged to the right and, since roller 60 is connected to slide 59 the piston is drawn to the right by means of fork 62, as shown in Figures 8 and 9.

The mandrel actuating mechanism

Referring to the apparatus actuated by the drive leading to gear 30 previously described, there is mounted on shaft 31 which carries the gear 30 a series of segments 100 to 103 inclusive, which segments are of similar structural formation, but which are assembled one with respect to another so as to operate in equally spaced time relation with respect to their relative rotation. These segments 100 to 103 inclusive are adapted to cause the displacement of the spindles 105 to 108 respectively, carrying mandrels 105′ to 108′ towards their molds 104, the said mandrels being conical and the molds likewise being conical. The spindles 105 to 108 are mounted for reciprocal displacement in bearings disposed on the frame as shown, said spindles having keyways 109 to 112, in which keyways are adapted to ride projections extending inwardly from each of pulleys A, B, C, D, disposed for rotation with said spindles.

As the shaft 31 is rotated clockwise, the respective segments 101 to 103 inclusive mounted thereon turn clockwise in the spaced time relation specified and are adapted to contact with the free ends of the spindles 105 to 108 inclusive, the contact, however, being initiated with respect to said spindles against horizontally mounted blocks 113 to 116 disposed at the free ends of said spindles, said blocks being adapted to be displaced inwardly a short distance (see Figure 2) against the tension of springs 113a to 116a, disposed on said spindles and having one end resting against the block and the other against collars 113b to 116b disposed intermediate of said spindles.

The blocks 113 to 116 inclusive have bored holes therein to receive a collar which is fastened to the end of the respective spindles, so that after the blocks on the respective spindles have been displaced inwardly against the tension of springs 113a to 116a for a slight distance, the contacting surface of the segments 101 to 103 inclusive contact directly against such collars to progressively urge towards and then cause the mandrel to remain in its mold. As is shown in Figures 1 and 2, blocks 113 to 116 inclusive are adapted to rest upon and be guided by bars K extending along the upper surface of the frame of said machine.

As shown in Figure 2, with reference to one particular spindle and mandrel associated therewith, and means for actuating the same, the spindle 106 has already been pushed forward and rotated for a period of time and now the mandrel carrying a shaped cone within its mold 104 is stationary, but, under pressure within the mold as a portion of the surface 101b of the segment 101 is in contact with the block 114 at the end of the spindle 106. Previously, the cam surface 101a of the segment 101 had pushed the spindle carrying the mandrel into the position as shown in Figure 2, and for a portion of the period during which the surface 101b of the segments 101a had contacted with the block 114, the mandrel carrying the baked batter was rotated within the mold. The means for causing the rotation of the fixed disposition of the mandrels within their respective molds will be later described.

On the spindles 105 to 108 inclusive are disposed a series of compression springs 105a to 108a inclusive, one end of the respective springs being adapted to abut the discs 105c to 108c fixed to the said spindle, the other end of such springs being adapted to abut bearings 105b to 108b disposed on the frame. During the interval that segment 101 by the contact of its surfaces 101a and 101b has caused the displacement of spindle 106 to the position shown in Figure 2, the spring 106a, representative of the springs on each of the respective spindles, has become compressed. As soon as the extreme end of section 101b turning clockwise in Figure 2 has passed block 114, the pressure against the spindle has been released and compressed spring 106a commences to expand and presses against disc 106c with the result that it initiates the displacement of the spindle 106 of the mandrel 106′ carried thereby away from its mold 104, thus releasing the compression of the mandrel carrying the formed cone within the mold.

Referring to Figures 2 and 5 now, projection 117b of the forked arm 117, which is carried on and driven by shaft 22 in a counter-clockwise direction, is adapted to press against the surface of disc 106c, which has been initially pressed against by spring 106a in its expansion, and as the forked arm 117 is rotated in counter-clockwise direction causes the spindle 106 to be urged to the left in both Figures 2 and 5, towards and to the initial position of the spindle, as shown at the left in Figure 1. In its movement towards the left, as specified, the mandrel carrying the cone which has been formed and sealed in the mold is adapted to be contacted by means of the stripping member 120, each unit of two halves, 120a and 120b, pivoted at 120c on a cross-bar 130, and held in closed position by means of springs 120d and 120e which are pinned to the cross-bar as at 120f. As the mandrel carrying the cone approaches the stripping member therefor the halves 120a and 120b thereof are displaced to the dotted line position shown in Figure 6, and are caused to press against the end of the baked cone carried on said mandrel, preventing the cone from further travel with the mandrel as it is further withdrawn to the left, by virtue of the action of the forked arm 117 urging the spindle carrying the same to the left to its extreme position, as represented by the spindle to the extreme left of the showing in Figure 1.

As shown in the disclosure, there are four stripping members, 120 to 123 inclusive, and each of said stripping members is disposed above the conveyor belt 48 with the result that as a mandrel carrying a cone is withdrawn and passes through a stripping member, the cone C stripped therefrom is dropped directly upon the inclined conveyor belt and discharged. As shown in Figure 1, mandrel 105 is being withdrawn from its mold with a finished cone; mandrel 106 is stationary as its cone is being sealed; mandrel 107 is rotating just after it has entered its mold, the rotation thereof causing the baked batter confection, which is disposed on surface 104a of the mold, to be drawn into and shaped within the mold, and mandrel 108 has just had its cone removed therefrom and is disposed in position ready to be again urged forward towards and into its mold.

Referring particularly to Figures 2 and 4, wherein are described the actuating mechanism for rotating the spindles and thus, the mandrels within their molds, to shape the cones and for retaining the mandrels within the molds under pressure without rotation to seal the cones, there are shown a series of cams 140 to 143 inclusive which are mounted for rotation with shaft 28, the specific drive for actuating the fixed shaft 28 having been previously described. The cams 140 to 143 are adapted to operate yokes 140a to 143a, which yokes are adapted to ride on guide bars 150 supported by cross-members 143 and 144; the said cams being equally spaced in time relation one with respect to another. The yokes have attached at one end thereof projections 140b to 143b inclusive in which are formed slots 140c to 143c inclusive, there being adapted to pass through said slots the driving belts E, F, G and H for the pulleys A to D inclusive, which are slidably mounted with respect to the spindles 105 to 108 inclusive, having projections or keys extending therefrom to cooperate with the keyways 109 and 112 inclusive, formed on the spindle shaft, so that they may not be affected with respect to their rotation by the longitudinal displacement of the spindles.

Leading from the driving means for shaft 42 which have been previously described, there is mounted on shaft 42 a pulley 42a about which passes and is driven belt 42b which passes around and drives pulley 42c keyed to shaft 42d which last-named shaft has mounted thereon (see the left of Figure 4) the fixed pulleys 42e therein and idler pulley 42f. On shaft 42 at the left of Figure 4, there is shown mounted the fixed pulley 42g and the idler pulley 42h. Intermediate of the shaft 38 there are mounted fixed pulley 38a and idler pulley 38b, while at the end of the shaft there is keyed thereto pulley 38c driving belt 38d, which surrounds and actuates pulley 38e therein, on driven shaft 38f, upon which last-named shaft are disposed the fixed pulley 38g and the idler pulley 38h.

The belts E, F, G and H, of which the action of G has already been previously described, all pass through slots in the projections on the yokes 140a to 143a, and are adapted to be moved to the left or the right, that is, to be disposed on the idler or the fixed pulleys on their respective shafts as the cams 140 to 143 displace the yokes 140a to 143a during the time that the surfaces 101b to 103b contact with the blocks 113 to 116 at the ends of the spindles; it being noted that as the belts E to H are on the fixed pulleys the rotation thereof causes the rotation of the pulleys A to D inclusive on the spindles, and thus, the rotation of the mandrels within the molds, while when the belts E to H are shifted by the action of the cams 140 to 143 to the idler pulleys, the respective belts do not act on the pulleys A to D with the result that the spindles are maintained in fixed position and the mandrels likewise maintained in fixed position within their molds for sealing the shaped cones. It is to be understood that although the details of the elements in the device have been described at some length, with respect to one individual mandrel, the same detail of construction is involved with respect to the remaining mandrels, it being understood, however, that each and every mandrel is controlled in its operation, so that it operates in executing its functions in a spaced time relationship with respect to the remaining mandrels.

It is obvious that various changes and modifications may be made to the details of construction without departing from the general spirit of the invention as set forth in the appended claims.

We claim:

1. In a cone making machine, the combination of a spindle having a mandrel at one end thereof, a mold in which said mandrel is adapted to be disposed, means for displacing said spindle to cause the mandrel thereon to proceed towards and enter into said mold, and a spring on said spindle adapted to be compressed as said spindle is displaced towards said mold, said spring being adapted to expand for initiating a displacement of the spindle away from said mold, and means independent of said first-named means and operable intermittently to return the spindle to its original position after partial displacement thereof.

2. In a cone making machine, the combination with a spindle having a conical mandrel, a conical mold, means adapted to intermittently contact with said spindle for longitudinally shifting said mandrel towards and into engagement with said mold, means on said spindle adapted to be compressed as said spindle is shifted towards and into said mold, said last-named means being adapted to reverse the directional displacement of movement of said spindle as said first-named means is brought out of contact with said spindle and means independent of said first-named means and intermittently operable to complete the displacement of said spindle from said mold to its original position.

3. In a cone making machine, the combination with a spindle having a conical mandrel at one end thereof, a conical mold, means intermittently operable to longitudinally shift said mandrel towards and into engagement with said mold, and means for initiating displacement of said mandrel out of engagement with said mold upon cessation of operation of said first-named means, and means independent of said first-named means and intermittently operable to continue the displacement of said mandrel from said mold to its original position.

4. In a cone making machine the combination of a conical mold, a spindle having a conical mandrel at one end thereof and having a block yieldably mounted on the other end thereof, means intermittently contacting with said block on said spindle for longitudinally shifting said spindle to cause the mandrel to proceed towards and enter into engagement with said mold, and means operable when said first-named means is out of contact with said block to cause return of said mandrel to its original position.

5. In a cone making machine, the combination of a conical mold, a spindle having a conical mandrel at one end thereof and a block yieldably mounted on the other end thereof, a compression spring on said spindle, means for intermittently contacting with said block to displace said mandrel towards and into engagement with said mold, said spring being adapted to be compressed as the mandrel is displaced towards and into said mold, said spring being adapted to expand and to initiate displacement of said mandrel out of and away from said mold upon cessation of contact of said first-named means with said block and means intermittently operable for completing the displacement of said mandrel to its original position.

6. In a cone making machine a mold, a mandrel adapted to be disposed within said mold, a spindle carrying said mandrel, and means for intermittently causing said mandrel to rotate and rest within said mold, said last-named means comprising a pulley on said spindle, a drive shaft, a plurality of pulleys, one fixed to and one idling on said drive shaft, a belt for connecting the pulley on the mandrel and one of the pulleys on said drive shaft, a slider through which said belt passes, a cam disposed within and periodically contacting with opposite faces of said slider to cause reciprocation of said slider and displacement of said belt upon the respective fixed and idler pulleys for controlling the action of said mandrel within said mold.

7. In a cone making machine, a cone forming mechanism comprising a mold, a mandrel cooperating with said mold, a spindle carrying said mandrel, means for periodically contacting and displacing the spindle towards, and said mandrel towards and into said mold, means for actuating said spindle to cause said mandrel to respectively rotate and rest under pressure within said mold to form and shape a backed cone, a spring on said spindle adapted to be compressed as the spindle is displaced towards said mold, said spring being adapted upon cessation of contact of said first-named means with said spindle, to expand and initiate a reversal of directional displacement of said spindle and mandrel with respect to said mold.

8. In a cone making machine, a cone forming mechanism comprising a mold, a mandrel cooperating with said mold, a spindle carrying said mandrel, means for periodically contacting and displacing the spindle towards, and said mandrel towards and into said mold, means for actuating said spindle to cause said mandrel to respectively rotate and rest under pressure within said mold to form and shape a baked cone, a spring on said spindle adapted to be compressed as the spindle is displaced towards said mold, said spring being adapted upon cessation of contact of said first-named means with said spindle, to expand and initiate a reversal of directional displacement of said spindle and mandrel with respect to said mold, and means independent of said first-named means and intermittently operable to contact with said spindle and complete the displacement to its original position of the spindle.

JOSEPH MATALON.
ELIE SHALOUM.